United States Patent [19]

Gingerich et al.

[11] Patent Number: 4,673,837
[45] Date of Patent: Jun. 16, 1987

[54] MOTOR BRUSH ASSEMBLY

[75] Inventors: David J. Gingerich, Swatara; Richard F. Granitz, Harrisburg; William H. Rose, Harrisburg; David T. Shaffer, Harrisburg, all of Pa.

[73] Assignee: AMP Incorporated, Harrisburg, Pa.

[21] Appl. No.: 807,775

[22] Filed: Nov. 12, 1985

Related U.S. Application Data

[63] Continuation of Ser. No. 609,166, May 11, 1984.

[51] Int. Cl.[4] .................................... H02K 13/00
[52] U.S. Cl. ................................ 310/239; 310/42; 310/43; 310/68 R; 310/72; 29/597; 29/827; 439/399; 439/404
[58] Field of Search ............... 310/239, 68 R, 241, 310/68 C, 242, 248, 245, 216, 42, 43, 240, 71, 72, 244, 89, 246, 247, 51; 29/597, 827, 883, 884; 339/97 R, 97 P, 98, 99

[56] References Cited

U.S. PATENT DOCUMENTS

| | | | |
|---|---|---|---|
| 1,874,000 | 10/1932 | Ehrlich | 310/239 |
| 2,514,693 | 7/1950 | Chapman | 310/68 C |
| 3,617,786 | 11/1971 | Stielper | 310/239 X |
| 4,087,150 | 5/1978 | Kubik | 339/97 P |
| 4,089,733 | 5/1978 | Zimmerman | 29/827 |
| 4,293,789 | 10/1981 | King | 310/71 |
| 4,355,253 | 10/1982 | Vollbrecht | 310/239 |
| 4,384,223 | 5/1983 | Zelt | 310/72 |
| 4,449,090 | 5/1984 | Gotoh | 310/72 |
| 4,501,983 | 2/1985 | Schmider | 310/68 R |

FOREIGN PATENT DOCUMENTS

| | | | |
|---|---|---|---|
| 0153260 | 11/1980 | Japan | 310/51 |
| 0157243 | 12/1981 | Japan | 310/51 |
| 0069449 | 4/1983 | Japan | 310/239 |
| 0826505 | 4/1981 | U.S.S.R. | 310/51 |

OTHER PUBLICATIONS

AMP Instruction Sheet IS 7768 (1977) "AMP Programmable Shunts for Dual-In-Line Package (DIP) Applications" (AMP Incorporated, Harrisburg, PA).

*Primary Examiner*—R. Skudy
*Attorney, Agent, or Firm*—Adrian J. LaRue; Anton P. Ness

[57] ABSTRACT

A motor brush assembly comprises a stamped and formed lead frame including electrical terminals at spaced locations and a dielectric housing member secured onto the lead frame with the electrical terminals being exposed and accessible for electrical termination to electrical power wires and lead wires of capacitors and inductors. Cavities are located in the housing member in which the inductors are disposed. Metal brush holders are positioned in brush holder locations on the housing member and lugs thereof are electrically stapled onto the lead frame. Openings are located in the housing member exposing severable sections of the lead frame separating the lead frame into separate brush circuits. If inductors are to be disposed in the circuit path between the terminated power leads and the brush holder locations, the respective severable sections are also severed which interconnect the lead frame between the associated pairs of terminals corresponding to each inductor. A ground terminal extends outwardly from the housing member.

12 Claims, 5 Drawing Figures

4,673,837

MOTOR BRUSH ASSEMBLY

This application is a continuation of application Ser. No. 609,166, filed May 11, 1984.

FIELD OF THE INVENTION

This invention relates to brush assemblies and more particularly to brush assemblies for DC motors.

BACKGROUND OF THE INVENTION

Conventional DC motor brush housings comprise carbon brushes that are spring biased against a commutator of the rotor and are mounted on a printed circuit or wiring board or a molded dielectric housing member. Lead wires for connection to an exterior power supply are hand soldered to circuit paths on the PCB or to posts secured in the molded housing member. Leads of capacitors and inductors for noise suppression are also hand soldered to circuit paths or posts and the metal brush holders with the capacitors being connected to ground that is generally a metal housing member in which the PCB or brush housing is mounted, the metal housing member containing a bearing in which the shaft of the rotor is mounted. These operations require numerous steps of handling, orientation of the PCB or housing member and the various components and hand soldering is required because of the irregular nature of the components and the small size of the PCB or housing member. These operations result in increased labor costs.

SUMMARY OF THE INVENTION

According to the present invention, a motor brush assembly comprises a stamped and formed lead frame including electrical terminals at spaced locations and a dielectric housing member secured onto the lead frame with the electrical terminals being exposed and accessible for electrical termination to electrical power wires and lead wires of capacitors and inductors. Cavities are located in the housing member in which the inductors are disposed. Metal brush holders are positioned in brush holder locations on the housing member and lugs thereof are electrically stapled onto the lead frame. Openings are located in the housing member exposing severable sections of the lead frame separating the lead frame into separate brush circuits. A ground terminal extends outwardly from the housing member.

According to another aspect of the present invention, a lead frame assembly for forming motor brush assemblies comprises stamped and formed lead frames having spaced electrical terminals onto which dielectric housing members are molded with the electrical terminals being accessibly exposed so that they can be readily terminated to electrical power wires and lead wires of capacitors and inductors, cavities in the housing members in which the inductors are disposed and brush holder locations on the housing members in which metal brush holders are positioned and electrically stapled to the lead frames.

DETAILED DESCRIPTION OF THE INVENTION

Figure 1:
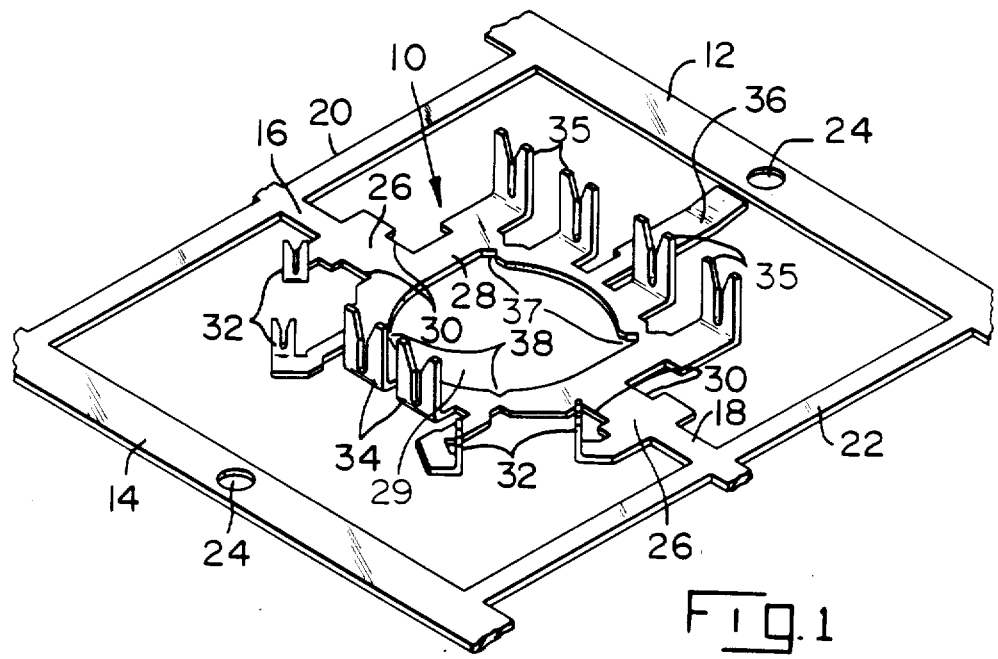
FIG. 1 is a perspective view of a stamped and formed lead frame.
Figure 2:
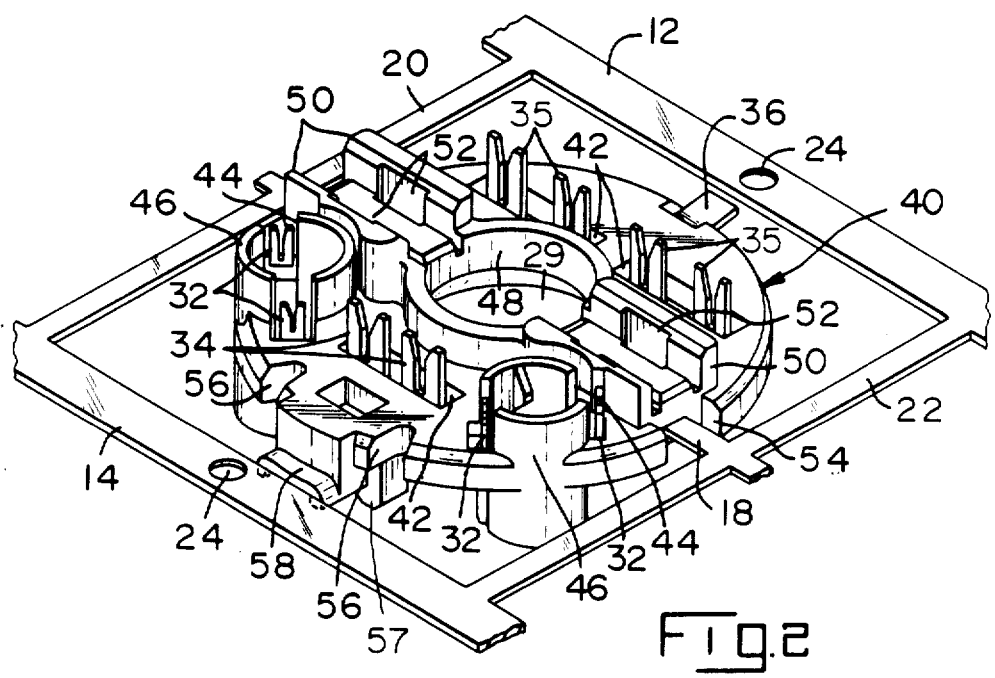
FIG. 2 is a view similar to FIG. 1 showing a dielectric housing member molded onto the lead frame forming a lead frame assembly.

FIG. 1 shows a lead frame assembly 10 that is stamped and formed from a metal strip having desirable spring and electrical characteristics and which is disposed between carrier strips 12 and 14 by metal strips 16 and 18 which are in turn connected to cross strips 20 and 22. Holes 24 are located in carrier strips 12 and 14. Metal strips 16 and 18 extend into plate sections 26 which in turn extend into a substantially circular section 28 around a large central aperture 29; recesses 30 are located in plate sections 26.

Electrical terminals 32, 34, 35 extend outwardly in the same direction from plate section 26 and circular section 28. Electrical terminals 32 face each other in spaced associated pairs whereas electrical terminals 34, 35 are disposed in pairs with one pair 34 located on one side of circular section 28 and two pairs 35 located on the other side. Electrical terminals 32 are smaller than electrical terminals 34, 35 and the terminating sections of terminals 32, 34, 35 have slots extending thereinto thereby defining electrical terminals of the insulation displacement type which are of known construction.

A ground contact 36 extends outwardly from circular section 28 between adjacent pairs of terminals 35. First severable sections 37 and second severable sections 38 are located in circular section 28, with severable sections 38 between electrical terminals 32 on one side of circular section 28, and severable sections 37 between each of the pairs of electrical terminals 35 on the other side of circular section 28. Severable sections 37, 38 remain unsevered until after a dielectric housing member is molded onto lead frame 10 to lend support to lead frame 10 prior to the molding operation.

While only one lead frame 10 is shown in FIG. 1, other lead frames will be present between carrier strips 12 and 14 to form a continuous strip of lead frames which are carried by carrier strips 12 and 14 into a conventional mold so as to mold dielectric housing member 40 thereon as shown in FIGS. 2 through 5. The material of dielectric housing member 40 has suitable dielectric material and strength characteristics. Slots 42 are located in housing member 40 through which the terminating sections of electrical terminals 34, 35 extend and the terminating sections of electrical terminals 32 are disposed in alignment with slots 44 in walls 46 which form cavities. Circular wall 48 extends around large central aperture 29 and outwardly from the top surface of housing member 40 and surrounds an opening that extends therethrough.

Parallel wall members 50 extend outwardly from circular wall 48 along plate sections 26 and they have channels 52 on the inside wall surfaces that are in communication with recesses 30 in plate sections 26. Recesses 54 are located in the edge of housing member 40 at the locations of metal strips 16, 18. Recesses 56 are also located in the edge of housing member 40 on each side of a C-shaped strain relief member 58. Posts 57 extend from housing member 40 proximate recesses 56 and in a direction opposed from terminals 34, around which power wire leads 68 are to be wrapped, as seen in FIGS. 3 and 4.

After the housing members 40 have been molded to lead frames 10, the continuous strip of lead frames can be reeled onto a reel member from which they can be fed into a component inserting machine (not shown) or fed from the molding operation to the component inserting machine which will insert components and power lead wires into the electrical terminals as well as clinch brush holder members onto the lead frames.

Figure 3:
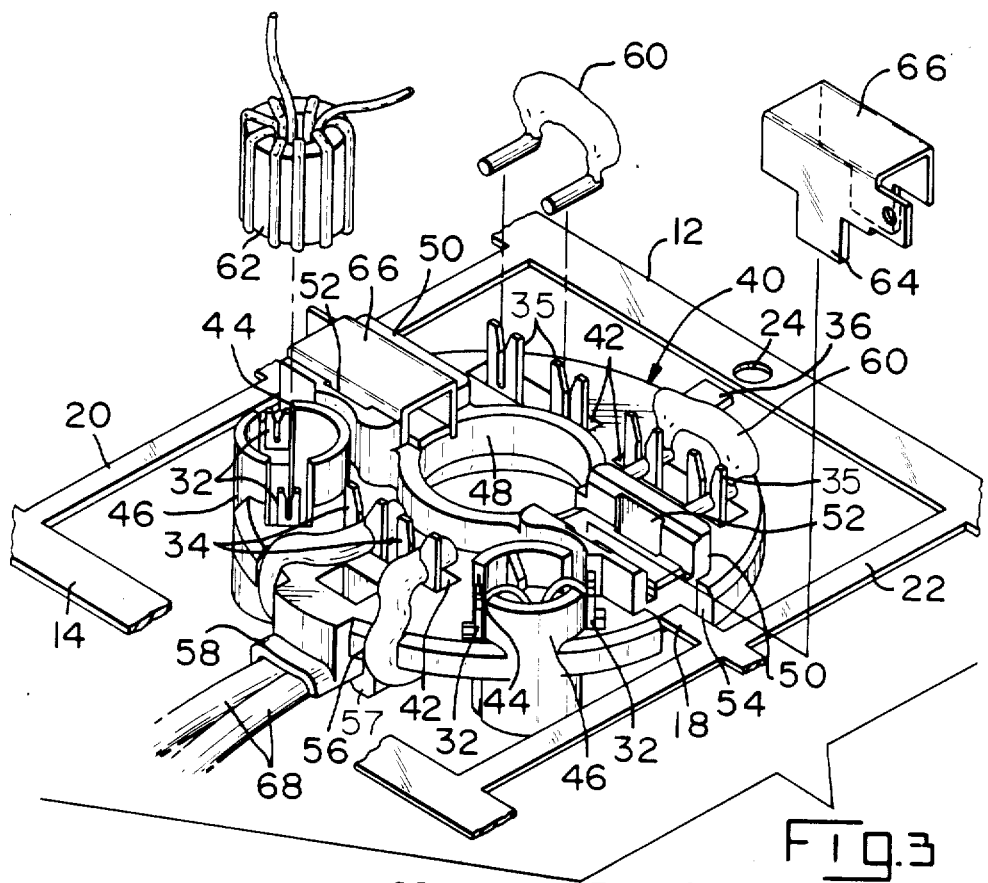
FIG. 3 is a view similar to FIG. 2 showing a partly-assembled motor brush assembly with electrical power wires, a capacitor, an inductor and a metal brush holder terminated to the lead frame assembly and parts exploded therefrom.
Figure 5:
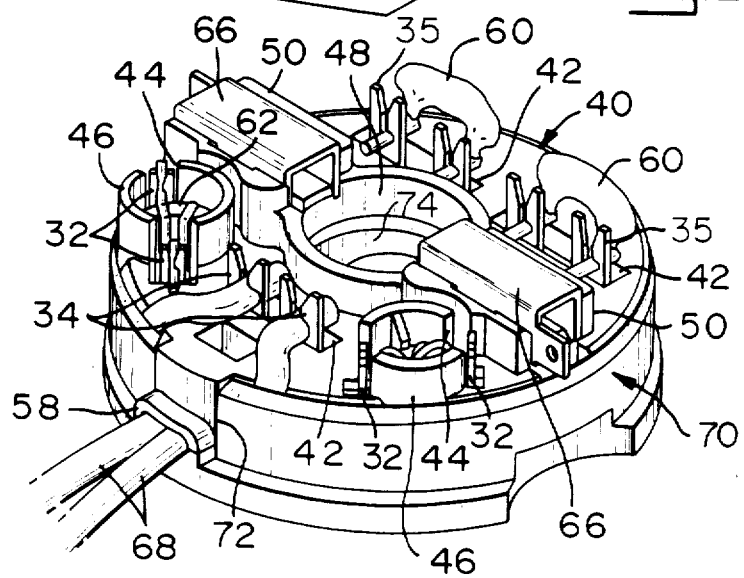
FIG. 5 is a perspective view of the motor brush assembly secured in a metal housing member.
Figure 4:
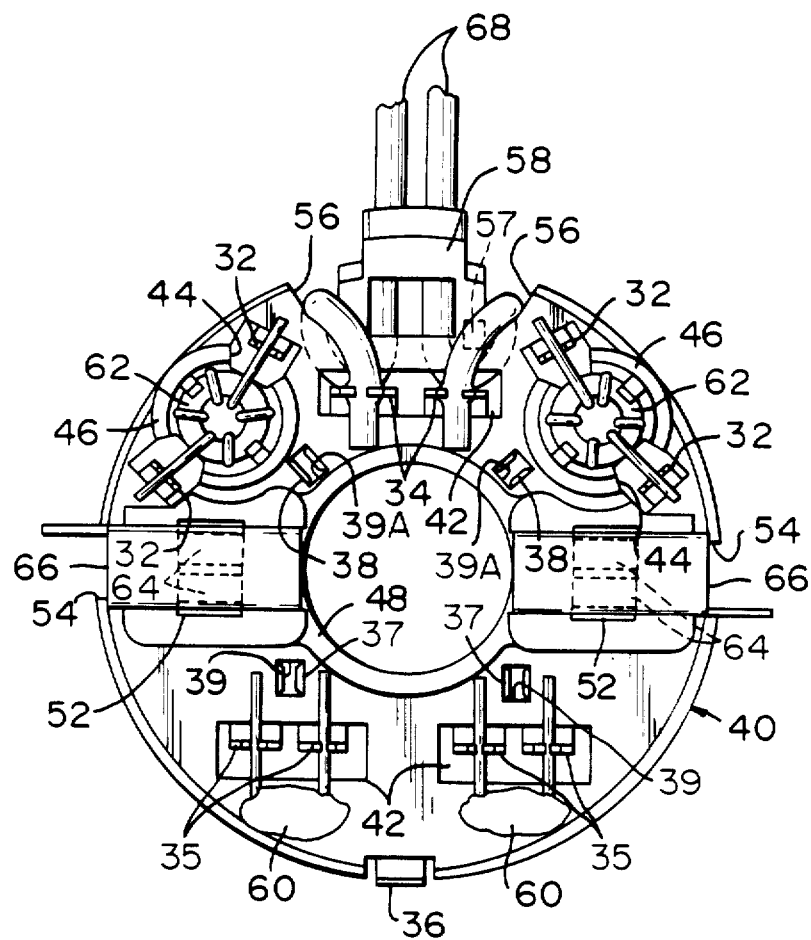
FIG. 4 is a top plan view of FIG. 3 of a motor brush assembly in an assembled condition.

In assembly, the lead wires of capacitors 60 are terminated in the slots of electrical terminals 35 while inductors 62 are disposed in the cavities formed by walls 46 and lead wires thereof are terminated in the slots of electrical terminals 32 as shown in FIGS. 3, 4, and 5. Lugs 64 of metal brush holders 66 extend along channels 52 between wall members 50 and they are bent into electrical engagement with exposed plate sections 26 in the bottom surface of housing member 40 thereby securing brush holders 66 in mechanical and electrical engagement between wall members 50 (not shown in the drawings). Insulated lead wires 68 have their ends terminated in the slots of electrical terminals 34 and are then disposed in respective recesses 56 and in strain relief member 58.

A motor brush assembly is thereby formed and can now be severed from cross strips 20,22 by severing metal strips 16 and 18 in recesses 54 whereafter the motor brush assembly can be secured in a metal housing member 70 which includes a bearing member 74 in alignment with the opening defined by of circular wall 48 and an opening 72 in which strain relief member 58 is located to permit lead wires 68 to extend outwardly therefrom. Although not shown in the drawings, ground contact 36 electrically engages metal housing member 70 to form a ground connection therewith.

Severable sections 37,38 are exposed in first and second openings 39, 39A respectively in housing member 40 as shown in FIG. 4, and the severable sections 37 disposed between terminals 35 in which capacitors 60 are terminated will be severed whereas the severable sections 38 disposed between electrical terminals 32 will be severed if inductors 62 are terminated therein. After severable sections 37 are severed, lead frame 10 becomes separated into separate electrical sections; and if severable sections 38 are severed, lead frame 10 becomes separated into further electrical sections. The use of inductors 62 in conjunction with capacitors 60 is more effective in noise suppression.

A motor brush assembly has been disclosed that utilizes a stamped and formed lead frame to which has been molded a dielectric housing member forming a lead frame assembly which includes electrical terminals for terminating lead wires of capacitors and inductors and power lead wires, and the housing member has cavities in which the inductors are disposed.

We claim:

1. A motor brush assembly, comprising:
   a stamped and formed lead frame including a large central aperture, plate sections for engagement with respective metal brush holders, pairs of first electrical terminals, and a pair of second electrical terminals each having conductor-connecting means for electrical connection with power wires, one of each pair of said first terminals being electrically connected to a respective said plate section and the other of each pair of said first terminals being electrically connected to a ground contact extending outwardly from said lead frame, said lead frame having first severable sections between the terminals of each said pair of first terminals;
   a dielectric housing member secured onto said lead frame with conductor-connecting means of said first and second terminals extending outwardly from said housing member for electrical connection to respective said leads, said housing member having a circular wall around said large central aperture of said lead frame defining a central opening, and said housing member having first openings exposing said first severable sections;
   said metal brush holders disposed in brush holder channels on said housing member and having integral lug sections secured to respective said plate sections in electrical engagement therewith, and including brush-receiving sections in communication with said central opening; and
   capacitors having leads electrically connected to conductor-connecting means of respective said pairs of first electrical terminals to provide noise suppression, said ground contact extending outwardly from said housing member, and said first severable sections being severed thereby separating said lead frame into separate electrical sections.

2. A motor brush assembly as set forth in claim 1, wherein said lead frame further includes pairs of third electrical terminals each having conductor-connecting means extending outwardly from said housing member, one of each pair of said third terminals being electrically connected to a respective said plate section and the other of each pair being electrically connected to one of said second terminals, said lead frame includes second severable sections between the terminals of each said pair of third terminals, said second severable sections being disposed in second openings of said housing member thereby being exposed.

3. A motor brush assembly as set forth in claim 2 wherein inductors are electrically connected to said conductor-connecting means of respective said pairs of third terminals, and said second severable sections of said lead frame are severed further separating said lead frame into further separate electrical sections.

4. A motor brush assembly as set forth in claim 2 wherein said housing member includes walls defining cavities in which inductors are to be disposed, said walls having substantially opposing slots in which said conductor-connecting means of said third electrical terminals are disposed to enable the leads of said inductors to be terminated thereto.

5. A motor brush assembly as set forth in claim 4 wherein said conductor-connecting means of said first and said second and said third terminals extend substantially normally upwardly from the plane of said lead frame and comprise insulation-displacement sections.

6. A motor brush assembly as set forth in claim 1 wherein said conductor-connecting means of said first and second terminals extend substantially normally upwardly from the plane of said lead-frame and comprise insulation displacement sections.

7. A motor brush assembly as set forth in claim 1 wherein a strain relief section is provided by said dielectric housing member in which said power wires are to be disposed.

8. A motor brush assembly as set forth in claim 1 further including a metal housing member secured thereto engaging said ground contact to form a ground connection therewith, said metal housing member including a bearing member in alignment with said central opening of said dielectric housing member.

9. A continuous strip of motor brush assemblies, comprising:

carrier straps having stamped and formed lead frames extending therebetween, each said lead frame including a large central aperture, plate sections for electrical engagement with respective metal brush holder members, pairs of first electrical terminals each having conductor-connecting means for electrical connection with leads of respective first noise suppression components, and a pair of second electrical terminals each having conductor-connecting means for electrical connection with power wire leads, ones of each pair of said first terminals being electrically connected to a respective said plate section and the other of each pair of said first terminals being electrically connected to a ground contact extending outwardly from said lead frame, said lead frame having first severable sections between the terminals of each said pair of first terminals; and dielectric housing members each molded onto a respective said lead frame outwardly from which extend said conductor-connecting means of said first and second terminals for electrical connection to respective leads, each said housing member having a circular wall around said large central aperture of said lead frame defining a central opening, and further having brush holder channels in communication with said central opening within which said metal brush holder members can be disposed in secured electrical engagement with respective said plate sections, and further having first openings exposing said first severable sections of said lead frame to be severed.

10. A continuous strip of motor brush assemblies as set forth in claim 9, wherein each said lead frame further includes pairs of third electrical terminals each having conductor-connecting means extending outwardly from the housing member associated with said lead frame for electrical connection with leads of respective second noise suppression components, one of each pair of said third terminals being electrically connected to a respective said plate section and the other of each pair being electrically connected to one of said second terminals, said lead frame including second severable sections between the terminals of each said pair of third terminals and disposed in second openings of said housing member thereby being exposed to be severed.

11. A continuous strip of motor brush assemblies as set forth in claim 10 wherein said housing member includes walls defining cavities in which respective said second noise suppression components are to be disposed, said walls having substantially opposing slots in which said conductor-connecting means of said third electrical terminals are disposed to enable the lead wires of said second noise suppression components to be terminated thereto.

12. A continuous strip of motor brush assemblies as set forth in claim 9 wherein said conductor-connecting means of said first and second terminals extend substantially normally upwardly from the plane of each said lead frame and comprise slotted termination sections of the insulation displacement type.

* * * * *